(12) United States Patent
Brandenberg et al.

(10) Patent No.: US 7,881,055 B2
(45) Date of Patent: Feb. 1, 2011

(54) PHYSICAL CONFIGURATION OF A HAND-HELD ELECTRONIC COMMUNICATION DEVICE

(75) Inventors: Carl Brock Brandenberg, Cresson, TX (US); Robert L. Kay, Fort Worth, TX (US)

(73) Assignee: Wireless Agents, LLC, Fort Worth, TX (US)

( * ) Notice: Subject to any disclaimer, the term of this patent is extended or adjusted under 35 U.S.C. 154(b) by 0 days.

(21) Appl. No.: 11/349,372

(22) Filed: Feb. 6, 2006

(65) Prior Publication Data
US 2006/0227500 A1 Oct. 12, 2006

Related U.S. Application Data

(63) Continuation of application No. 10/655,802, filed on Sep. 5, 2003, now Pat. No. 7,016,182, which is a continuation of application No. 09/745,617, filed on Dec. 20, 2000, now Pat. No. 6,665,173.

(60) Provisional application No. 60/172,675, filed on Dec. 20, 1999.

(51) Int. Cl.
*G06F 1/16* (2006.01)
(52) U.S. Cl. .................. 361/683; 361/681; 361/680; 400/82; 400/682
(58) Field of Classification Search ................. 361/683, 361/681, 680; 400/82, 682
See application file for complete search history.

(56) References Cited

U.S. PATENT DOCUMENTS

| 5,712,760 A | * | 1/1998 | Coulon et al. ............... 361/680 |
| D443,839 S | * | 6/2001 | Brandenberg et al. ........ D10/65 |
| 6,297,752 B1 | * | 10/2001 | Ni ................................ 341/22 |

FOREIGN PATENT DOCUMENTS

JP 7013658 A * 1/1995

* cited by examiner

*Primary Examiner*—Lisa Lea-Edmonds
(74) *Attorney, Agent, or Firm*—James E. Wallon

(57) ABSTRACT

A hand-held, electronic, bi-directional, wireless electronic communication device having a physical configuration which includes a relatively large, constantly visible display and an alphanumeric keyboard that can be concealed until needed.

33 Claims, 13 Drawing Sheets

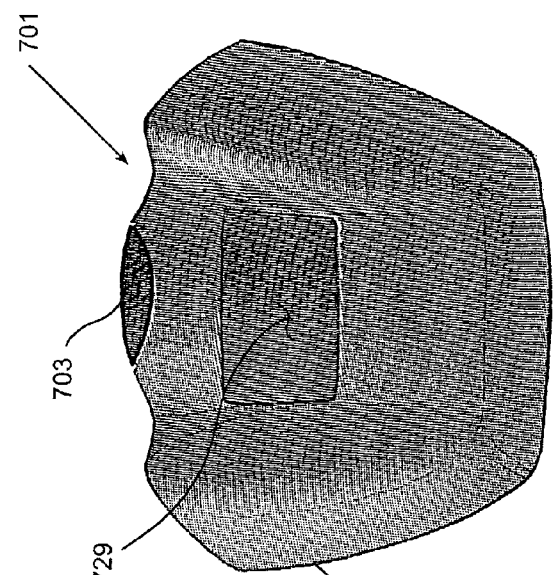
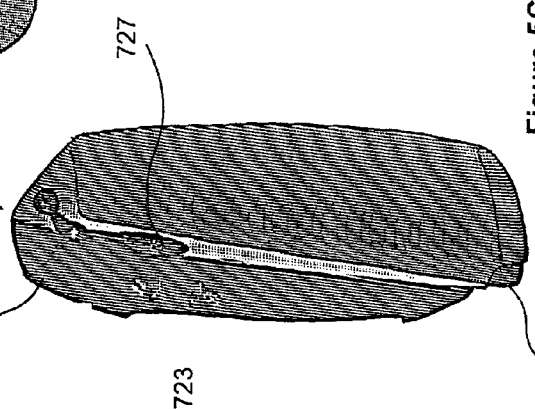
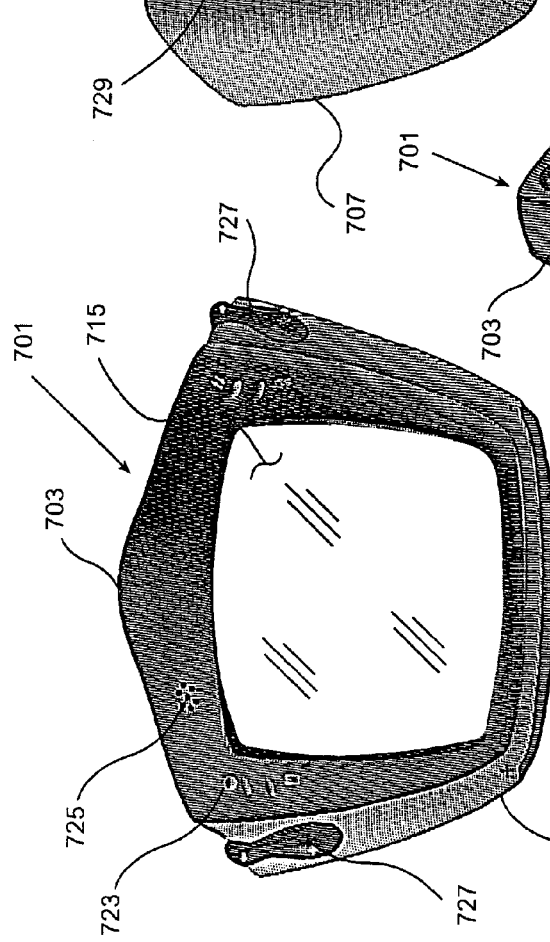

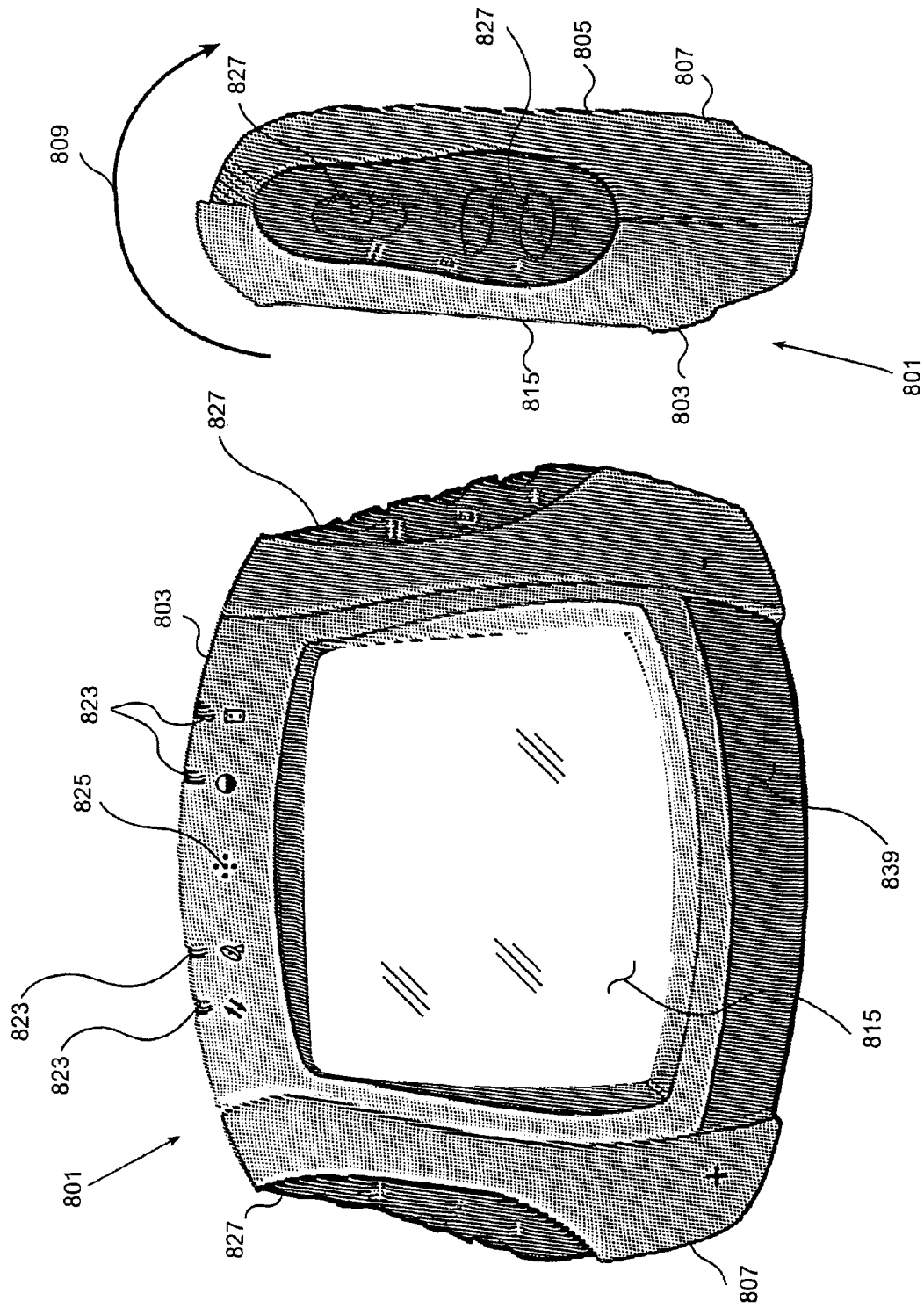

PHYSICAL CONFIGURATION OF A HAND-HELD ELECTRONIC COMMUNICATION DEVICE

This is a Continuation of prior application Ser. No. 10/655,802, filed 5 Sep. 2003 now U.S. Pat. No. 7,016,182, which is a continuation of Ser. No. 09/745,617 filed 20 Dec. 2000 now U.S. Pat. No. 6,665,173, for "Physical Configuration of a Hand-Held Electronic Communication Device," which claims the benefit of U.S. Provisional Patent Application Ser. No. 60/172,675, filed 20 Dec. 1999.

BACKGROUND OF THE INVENTION

1. Field of the Invention

The present invention relates to the physical configuration of hand-held, electronic devices. In particular, the present invention relates to the physical configuration of hand-held, electronic devices capable of bi-directional, wireless data communication.

2. Background Information

Until now, hand-held, wireless devices have primarily been used for person-to-person communication by voice, transmitting and receiving voice data in real-time. These "mobile phone" devices have allowed users to go wherever they like and still be in touch with their friends and colleagues just as though they were using a wired phone at home or work. Communication by textual means, such as e-mail, has been performed almost exclusively over land-based copper and fiber optic phone lines, because the wireless communication networks have simply not had the capacity or capability to provide cost effective, wireless transmission of textual data. But recent advancements in wireless technology have made it possible to provide cost-effective data transfer over existing wireless networks.

The most common means of textual communication has been e-mail, but a relatively new form of messaging called "instant messaging" (IM) has caught on and has grown very rapidly in popularity in the last several years. Unlike e-mail which sits in an electronic mailbox until the user retrieves his or her e-mail messages, IM occurs nearly instantaneously, producing a notification and a dialog box on a user's screen alerting the user that they have an incoming message. In addition, users have the ability to know if the recipient is on-line and available to receive an IM message.

Many hand-held, wireless devices are beginning to provide access to e-mail, but their functionality is currently very limited. The user is usually limited to browsing, that is receiving and reviewing the information, not authoring and sending data. Much like retrieving voice messages from a voice mailbox, the user is only able to retrieve e-mail messages from their e-mail inbox. The primary reason for this is that authoring messages requires a convenient method of alphanumeric data entry. Users are hesitant or reluctant to enter a message if the data entry process is slow and difficult. This is a problem that conventional devices cannot properly address due to user interface limitations, i.e., the capabilities, design, and layout of the physical devices. While e-mail may require entry of a moderate length message in response to a received message, such data entry usually happens at a time the user deems appropriate and convenient, not at a time dictated by the sender of the message. This is very much like the user being able to periodically check voice messages in a voice mailbox, and respond at the user's convenience.

However, IM and other types of instantaneous textual and graphical communication are more real-time and intrusive than e-mail; the same way that an incoming phone call is more real-time and intrusive than checking voice messages. IM is a much more frequently accessed and used system than an e-mail client; therefore, IM requires a network and device that are much more convenient to use than an e-mail client. Such a level of convenience has been possible with wired connections and desktop computers. With traditional desktop computers, the computer is placed on or near the work surface and the display and keyboard are easily accessible. The user can immediately see incoming IM messages presented on the display, then respond to the IM messages using the keyboard. The user does not have to remove a device from the user's belt clip or pocket and open the device to see the IM message. Neither does the user have to then locate a work surface for support and connect a peripheral keyboard in order to compose a response.

There are a variety of devices available that are capable of providing wireless access to textual information, such as mobile phones, personal digital assistants (PDA's), hand-held computers, and two-way pagers, but the compromises in all of these designs limit their suitability as IM devices. For some of these devices, the displays are always visible and easy to see, but the device lacks an input device, has a small and inappropriate input device, has a slow and error prone method of data entry, or requires additional peripheral devices and a work surface for support. For other devices, a suitable input device is present, but the device transforms between multiple states which prevent the display from being seen in one of the states, limiting the convenience of using the device on a frequent basis.

Conventional wireless communication devices can be categorized into several distinct configurations: (1) mobile phones, commonly known as cellular phones; (2) personal digital assistants, commonly referred to as PDA's; (3) hand-held computers, commonly referred to as palmtop computers; and (4) two-way pagers.

The configuration of a mobile phone typically consists of: (1) a small display that is always visible; (2) a keypad for numeric data entry; and (3) an internal communication module that can transmit and receive analog and/or digitized voice data.

The mobile phone configuration has the following disadvantages: (1) the display is typically very small and inappropriate for display of large amounts of textual data, i.e., they are typically proportioned for one or two rows of phone numbers and proper names, not textual data in the structure of a written sentence; (2) the keypad is commonly located adjacent to the display, increasing the overall size of the unit; (3) on some units, the device has a clamshell design that obscures both the keypad and display when closed; (4) the keypad is typically a twelve-digit keypad designed for numeric data entry, although the keyboard usually supports alphanumeric character entry for the purpose of entering proper names into an address book maintained in the phone's memory, whereby the commonly used method of accessing alphanumeric characters is to switch the device into a text entry mode, then press a key repeatedly to access a particular one of a subset of characters available for each key, this method being extremely slow, awkward, error prone, and not appropriate for a device intended to transfer textual data on a regular basis; and (5) the communication module is typically engineered to support voice communication, and in only the latest device versions, limited retrieval of alphanumeric data.

The configuration of a PDA typically consists of: (1) a large display that is always visible; (2) a touch screen and stylus for data entry; (3) no keyboard for data entry; and (4) no internal communication module.

The PDA configuration has the following disadvantages: (1) the device has no keyboard, so alphanumeric data entry is usually performed in one of two ways: (a) the user taps with a hand-held stylus on a "soft" keyboard that is drawn on the display, or (b) the user writes on screen with a hand-held stylus and the processor converts the user's writing into text data; (2) an optional detachable keyboard may be available, but the keyboard usually requires a flat surface for support during use as it is tethered to the device by a cable or attaches in such a way that it will easily become detached if tilted, thus making the keyboard extremely awkward for use in one hand while on the move; and (5) the device lacks a communication module, although modules may sometimes be added, but at the expense of consuming the port available for connecting the optional keyboard to.

The configuration of a palmtop computer typically consists of: (1) a large display screen; (2) a complete keyboard; (3) a clamshell design where the display closes over the keyboard, or a flat layout where the display is located adjacent to the display; and (4) no internal communication module.

The palmtop configuration has the following disadvantages: (1) although the clamshell design affords protection to the display and keyboard when the device is closed, the clamshell design often renders the display non-visible when the device is closed, and is not adequate for frequent presentation of information to a user on the move; and (2) the relatively large size makes the device prohibitive for use as an IM device, because when a large display and keyboard are present, the device becomes inconvenient for the user to carry on a regular basis, resulting in the usability of the display and keyboard being greatly reduced.

The configuration of a two-way pager typically consists of: (1) a small display screen; (2) a small, complete keyboard; and (3) a flat layout where the keyboard is located adjacent to the display, or clamshell design where the display folds over the keyboard when closed.

The two-way pager configuration has the following disadvantages: (1) units with a flat layout have displays that are always visible, but to keep the overall device size down, the display and keyboard are reduced to minuscule dimensions which greatly reduces their usability; and (2) units with a clamshell design, render the display non-visible when the unit is closed, adding inconvenience when the user must look at the display.

The distinction between each category of devices is blurring daily, but a trend is very evident in all the previously mentioned devices. The devices are either: (1) designed primarily for voice communication and have limited alphanumeric entry capability, or a capability that is not suited to use in your hands while on the move; or (2) designed primarily for occasional retrieval and display of textual information and have a design that is very inconvenient for frequent input and viewing of data while on the move.

Some of these concepts are embodied in the following U.S. patents: U.S. Design Pat. No. Des. 416,256 issued to Griffin et al. which discloses a hand-held messaging device with keyboard; U.S. Pat. No. 5,548,478 issued to Kumar et al. which discloses a portable computing device having an adjustable hinge; U.S. Pat. No. 5,638,257 issued to Kumar et al. which discloses a combination keyboard and cover for a hand-held computer. U.S. Pat. No. 5,712,760 issued to Coulon et al. which discloses a compact foldable keyboard; and U.S. Pat. No. 5,949,408 issued to Kang et al. which discloses a dual orientation display hand-held computer. These devices either have fixed keyboards or use folding clamshell designs. As such, they are not good choices for IM and other types of instantaneous textual and graphical communication.

Although the devices, designs, and physical configurations discussed above represent great strides in the area of physical configuration of hand-held communication devices, many shortcomings remain.

SUMMARY OF THE INVENTION

There is a need for a hand-held, electronic, bi-directional, wireless communication device that 1) contains a relatively large, constantly visible display capable of rich presentation of information, 2) that contains an alphanumeric keyboard that is usable by human hands and 3) that is small enough to carry and convenient enough to use under usage conditions typically encountered with a mobile phone device.

Therefore, it is an object of the present invention to provide a hand-held, electronic, bi-directional, wireless communication device having a physical configuration which includes a relatively large, constantly visible display and an alphanumeric keyboard that can be concealed until needed.

It is another object of the present invention to provide a hand-held, electronic, bi-directional, wireless communication device having a physical configuration which includes a body portion, a display portion that translates relative to the body portion, a relatively large, constantly visible display carried by the display portion, and an alphanumeric keyboard carried by the body portion, the alphanumeric keyboard being concealed by the display portion when not in use.

It is another object of the present invention to provide a hand-held, electronic, bi-directional, wireless electronic communication device having a physical configuration which includes a body portion, a display portion that pivots relative to the body portion, a relatively large, constantly visible display carried by the display portion, and an alphanumeric keyboard carried by the body portion, the alphanumeric keyboard being concealed by the display portion when not in use.

It is another object of the present invention to provide a hand-held, electronic, bi-directional, wireless communication device having a physical configuration which includes a body portion, a display portion coupled to the body portion, a relatively large, constantly visible display carried by the display portion, and an alphanumeric keyboard that translates into the interior of the body portion when not in use.

It is another object of the present invention to provide a hand-held, electronic, bi-directional, wireless communication device having a physical configuration which includes a body portion, a display portion coupled to the body portion, a relatively large, constantly visible display carried by the display portion, and a two-piece alphanumeric keyboard that translates into the interior of the body portion when not in use.

These objects are achieved by providing a hand-held, electronic, bi-directional, wireless communication device having a physical configuration which includes a relatively large, constantly visible display and an alphanumeric keyboard that can be concealed until needed. The communication device of the present invention has a physical configuration operable between an "open" state in which the alphanumeric keyboard is visible, and a "closed" state in which the alphanumeric keyboard is concealed. This allows the information presented by the communication device to be viewable in either the open or closed state. A user can quickly and easily transform the device from the closed state to the open state with either one or two hands, while viewing the constantly visible display without interruption. The display is larger than those used on mobile phones and can display text and graphics at a convenient size and resolution. The alphanumeric keyboard is easier and faster to use and learn than the keypads and touch screens on most mobile phones and personal digital assistants. The keyboard may be a keyboard with a layout such as the common "QWERTY" layout, but need not be limited to this particular layout. Other layouts may include the "FITALY" layout, the "Dvorak" layout or any other alphanumeric layout that includes a substantially full set of alphanumeric keys.

The present invention has many advantages over existing device configurations. Because the display is constantly visible, the user can immediately see incoming messages or communications and respond appropriately. The display is relatively large to accommodate long textual messages, graphical communications, or a combination of both. The user can quickly and easily transform the device from the closed state to the open state without his view of the display being interrupted. The full alphanumeric keyboard allows the user to quickly and easily transmit messages and other textual and graphical communications in a complete and intuitive manner without having to attach peripheral devices. The unique physical configuration of the present invention is not only effortless to learn and use, it encourages users to participate in these new forms of communication.

BRIEF DESCRIPTION OF THE DRAWINGS

FIG. 5A is a front view of an alternate hand-held, electronic, bi-directional wireless communication device having a physical configuration of the type illustrated in FIGS. 1A-1C in a closed state.

FIG. 5B is a rear view of the device of FIG. 5A.

FIG. 5C is a right side view of the device of FIG. 5A.

FIG. 6A is a front view of a hand-held, electronic, bi-directional wireless communication device having a clamshell-type physical configuration in which a keyboard or other input device hingedly pivots relative to a constantly visible display.

FIG. 6B is a right side view of the device of FIG. 6A.

DETAILED DESCRIPTION OF THE PREFERRED EMBODIMENT

Figure 1A:
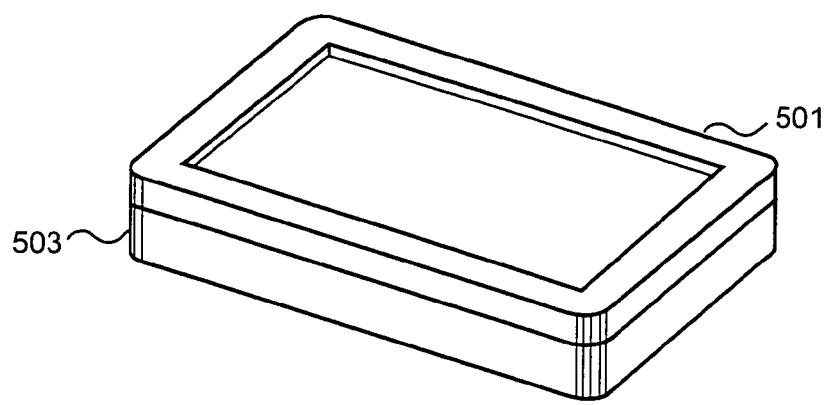
FIG. 1A is a perspective view of a simplified representation of the hand-held, electronic communication device having a physical configuration according to the present invention.

Referring generally to FIGS. 1A-1C, 2A-2D, and 3A-3C in the drawings, simplified representations of a hand-held, electronic communication device having a physical configuration according to the present invention are illustrated. To be convenient for IM and other instantaneous textual and graphical communications, a device must be able to support effortless reading of incoming IM messages and rapid entry of responses. Such support minimizes the inconvenience of the intrusion of the IM message. The device should allow a minimum amount of effort to perform the tasks involved when using IM.

The device configuration of the present invention provides the following unique and distinct features:

1. A relatively large display screen capable of displaying textual and graphical information, allowing for a rich presentation of information;

2. A display screen that is always visible. If, for example, the device must transition from a closed state that is characterized by maximum portability to an open state that is characterized by maximum usability, the display is constantly visible in each state. Users are very intolerant of a device that must be manipulated and opened in order to view the display each and every time a message or notification occurs;

3. An alphanumeric data entry means that is suitable for use with human hands without the aid of an additional pointing device such as a stylus and that is designed for rapid entry of alphanumeric data; and 4. A relatively small size which makes the device convenient for portable use and allows the device to be operated, ideally, with one or two hands.

To ensure that the device of the present invention is appropriate for mobile use, the device is small and convenient to carry and use. The device is capable of being configured in at least two distinct states that maximize both its portability and usability.

One device state maintains a small footprint, whereby the device consumes a minimal amount of volume and affords a greater level of portability and concealment, herein called the "closed" state. In this closed state, the display is visible, but the keyboard is concealed to minimize space and maximize portability. A second device state affords a more efficient level of alphanumeric data entry, herein called the "open" state. In the open state, the display is visible and the keyboard is accessible to maximize usability. The device can transition from the open state to the closed state easily and with a minimum of effort, preferably with one hand. Preferably, the display translates relative to the main housing to reveal the keyboard. However, the display may either pivot or rotate relative to the housing to reveal the keyboard, or the keyboard may telescope into the interior of the housing. In the preferred embodiment, the device's display remains visible in either state, allowing the user to observe incoming messages without having to manipulate the device to transition it from one state to another, such as from closed to open.

In order to overcome the limitations of current hand-held, electronic devices that serve or can be adapted to the purpose of bi-directional, wireless communication of textual and graphical information, the present invention provides a new and improved configuration of a device that allows for the inclusion in the device of both a large, always visible display screen and an alphanumeric data input device that allows rapid and comfortable entry of alphanumeric data. The device of the present invention preferably has a large, color display screen capable of displaying textual and graphical information for rich presentation of information. Because the display screen is always visible and hence exposed and susceptible to damage, a cover made of either a rigid or flaccid material to afford protection may protect the display. The cover may be of a material such as a clear plastic or rubber that allows the display to remain visible even when covered. Further, the device of the present invention has an alphanumeric data input device that allows rapid and comfortable entry of alphanumeric data. The present invention provides a configuration such that the device can be held and operated with one or two hands in a convenient and comfortable manner under usage conditions typically encountered with a mobile phone device.

The device of the present invention comprises at least the following components: (1) an alphanumeric data input device, such as a full QWERTY-type keyboard or thumbboard; (2) a display device, such as an LCD, LED, or LEP display screen; (3) a processor; (4) a power source, such as a battery or mechanical generator like a wind-up spring mechanism; (5) a communication module, such as a CDPD, CDMA, GSM or GPRS radio capable of wireless data transmission and reception; and (6) a physical housing that contains these components and that consists of at least two discrete portions that may translate, rotate and/or pivot relative to one another, one portion containing a display device and one portion containing a keyboard.

The display, preferably color, is always visible as the device transitions from a closed state characterized by maximum portability to an open state characterized by maximum usability. The display may translate, rotate, or revolve relative to the main housing of the device. The display will be large enough to accommodate simultaneous textual messages, graphical displays, and graphical animations. The device and corresponding wireless network include integral support of IM and other instantaneous textual and graphical communication. The exterior layout of the device is heavily influenced by the capability to effectively utilize these types of instantaneous communication.

Although the device may be placed in an "off" state in which no power is supplied to the device, it is preferred that the device remain either in an "on" state in which the device has full functionality, or a "sleep" state in which the device may appear to the user to be off, but is, in fact, performing certain background functions. In the fully functional "on" state, the device is displaying digital content and the user is interacting with the device. In the "sleep" state, the user is not interacting with the device and the display screen on the device has cycled down and is not actively displaying digital content. In the sleep state, the display screen may be blank or may be displaying a preprogrammed graphic or image. If the device is in the sleep state and the user begins to interact with the device, or if the user receives a "hot" communication, the device immediately switches from the sleep state to the on state so that the user may fully utilize all features and functionality of the device.

The device may include a variety of additional input/output components, such as lights, LED's, buttons, joysticks, a touch pad, an analog responder, and others components which allow the user to view information and manipulate the device to a certain degree without transitioning the device to the open state.

Figure 1B:
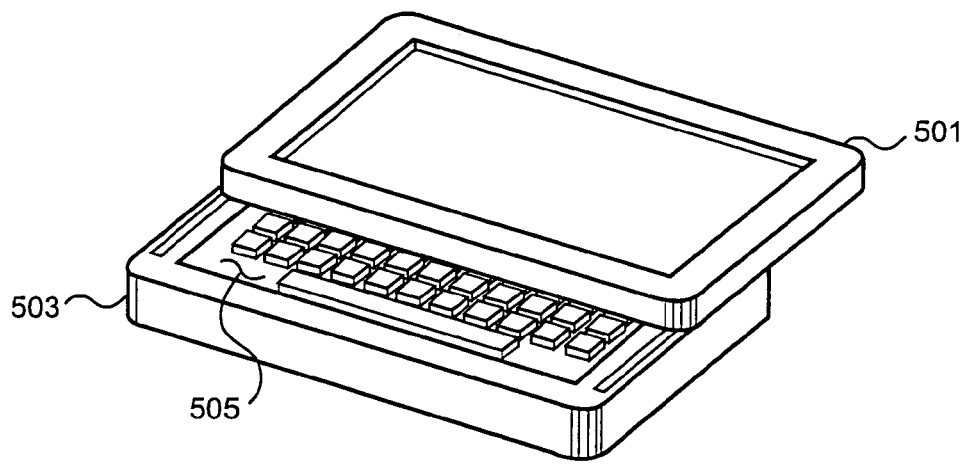
FIG. 1B is a perspective view of the device of FIG. 1A depicting how a constantly visible display translates relative to a body portion to expose a keyboard or other data input device that is carried by a body portion.
Figure 1C:
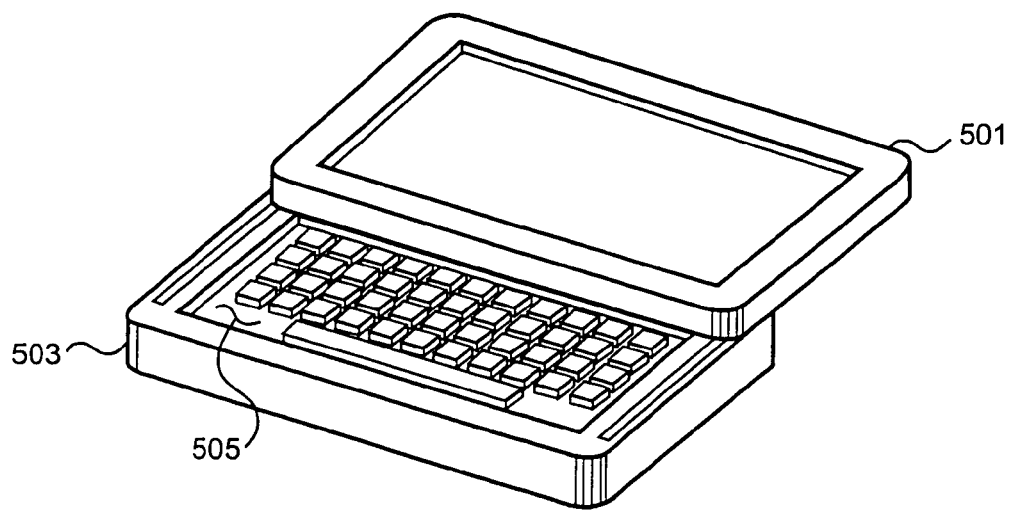
FIG. 1C is a perspective view of the device of FIG. 1A with the constantly visible display in a position which fully reveals the keyboard or data input device.
Figure 2A:
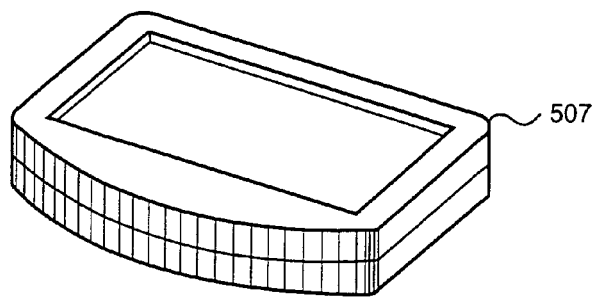
FIG. 2A is a perspective view of an alternate simplified representation of a hand-held, electronic communication device having a physical configuration according to the present invention.
Figure 2B:
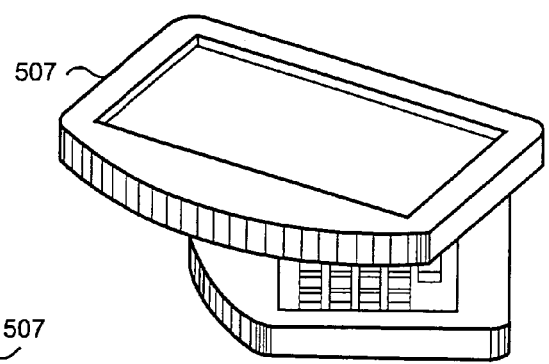
FIG. 2B is a perspective view of the device of FIG. 2A depicting how a constantly visible display pivots relative to a body portion to reveal a keyboard or other data input device.
Figure 2C:
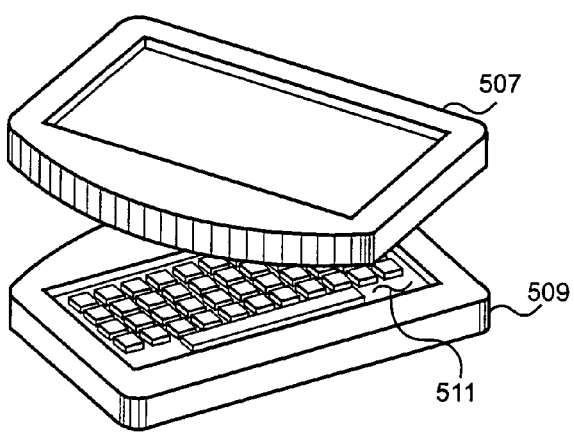
FIG. 2C is a perspective view of the device of FIG. 2A depicting how the constantly visible display further pivots relative to the body portion to reveal the keyboard or other data input device.
Figure 2D:
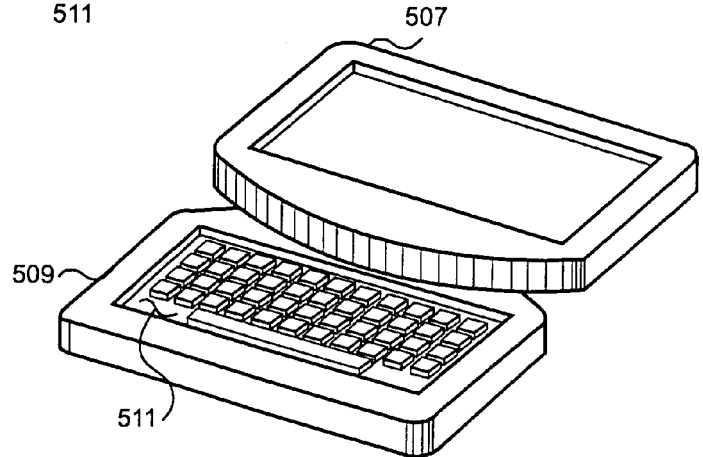
FIG. 2D is a perspective view of the device of FIG. 2A with the constantly visible display pivoted to fully reveal the keyboard or other input device.

A first device configuration is specifically depicted in FIGS. 1A-1C. A constantly visible display 501 translates relative to a body portion 503 to reveal a full QWERTY-type keyboard or other input device 505. This first device Configuration includes the following features: (1) the display remains visible when the device is in either the open or closed state; (2) in the closed state, the display remains visible, but obscures the full keyboard or other input device; (3) the display is generally parallel with the keyboard or other input device and translates relative to the body portion such that the keyboard or other input device is revealed when the device is transitioned from the closed state to the open state; and (4) when transitioning from the closed state to the open state, the display translates in a plane that is generally parallel to the plane of the keyboard or other input device.

A second device configuration is specifically depicted in FIGS. 2A-2D. A constantly visible display 507 pivots relative to a body portion 509 to reveal a full QWERTY-type keyboard or other input device 511. This second device configuration includes the following features: (1) the display remains visible when the device is in either the open or closed state; (2) in the closed state, the display remains visible, but obscures the input device; (3) the input device is movable such that it is revealed from below the display when the device is transitioned from the closed state to the open state; and (4) when transitioning from the closed state to the open state, the input device moves in one or a combination of a sliding, hinging, or pivoting movements.

Figure 3A:
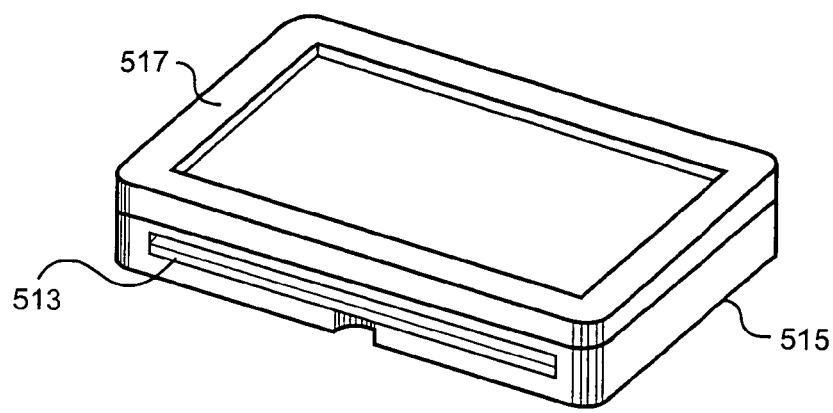
FIG. 3A is a perspective view of an alternate simplified representation of a hand-held, electronic communication device having a physical configuration according to the present invention.
Figure 3B:
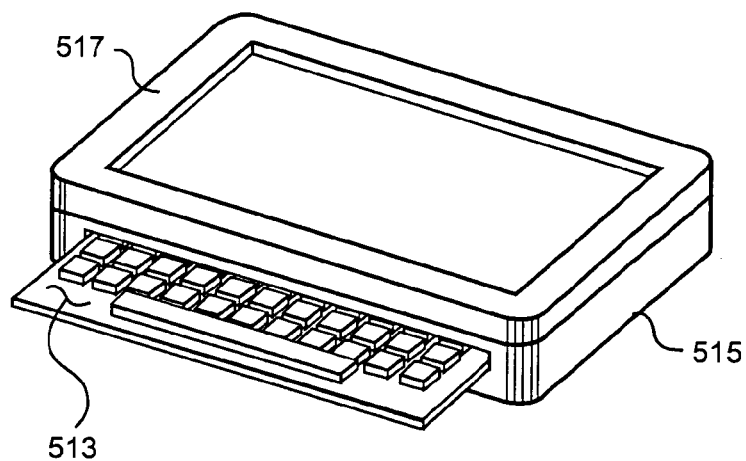
FIG. 3B is a perspective view of the device of FIG. 3A depicting how a keyboard or other data input device extends outward from the interior of a body portion.
Figure 3C:
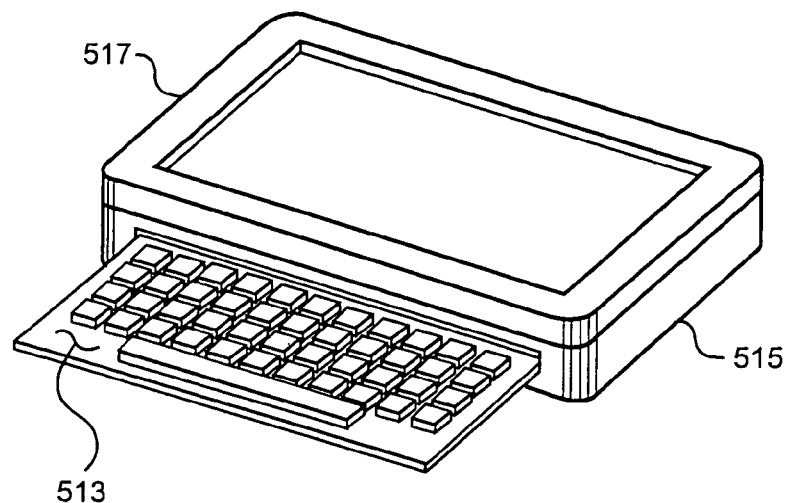
FIG. 3C is a perspective view of the device of FIG. 3A with the keyboard or other data input device in a fully extended position.

A third device configuration is specifically depicted in FIGS. 3A-3C. An input device 513 translates into a body portion 515 which carries an always visible display 517. This third device configuration includes the following features: (1) the display remains visible when the device is in either the open or closed state; (2) in the closed state, the keyboard display remains visible, but obscures the input device; (3) the input device is movable such that it is revealed from below the display when the device is transitioned from the closed state to the open state; and (4) when transitioning from the closed state to the open state, the input device moves in one or a combination of a sliding, hinging, or pivoting movements.

Regardless of the configuration chosen, the device is a hand-held device that can be held by one or two hands and conveniently carried or worn by the user on his or her person. The device is operated in a convenient and comfortable manner under usage conditions typically encountered with a mobile phone device.

Figure 4A:
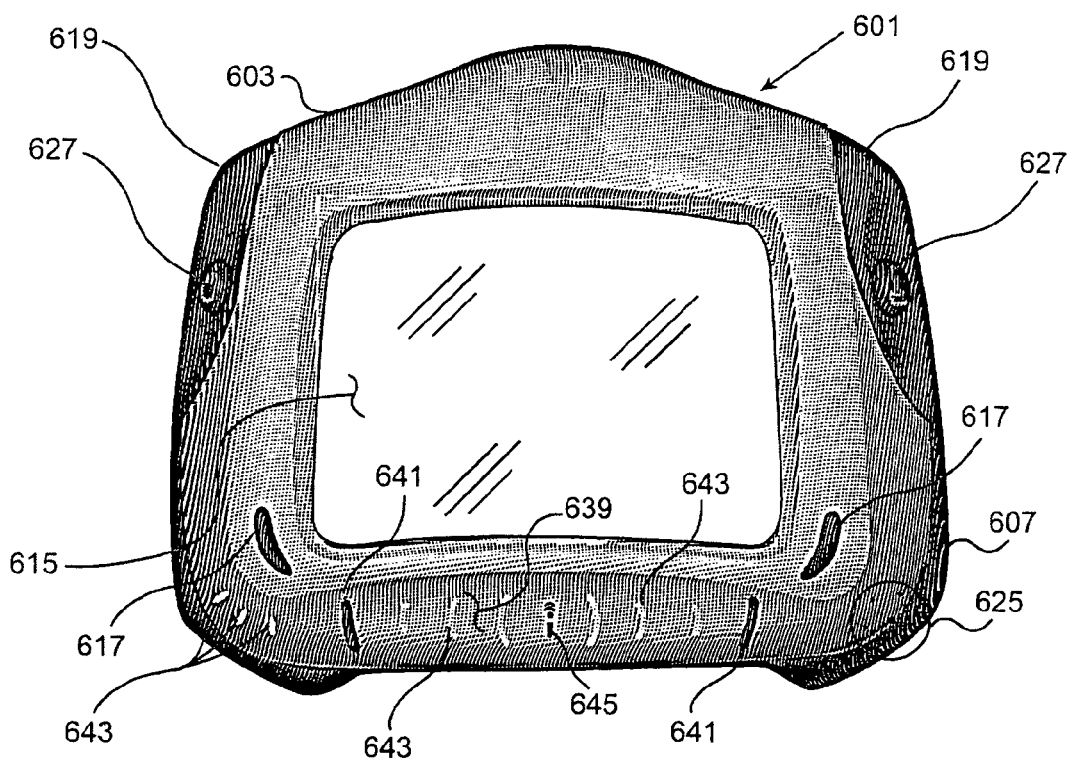
FIG. 4A is a front view of a hand-held, electronic, bi-directional wireless communication device having a physical configuration of the type illustrated in FIGS. 1A-1C in a closed state.
Figure 4B:
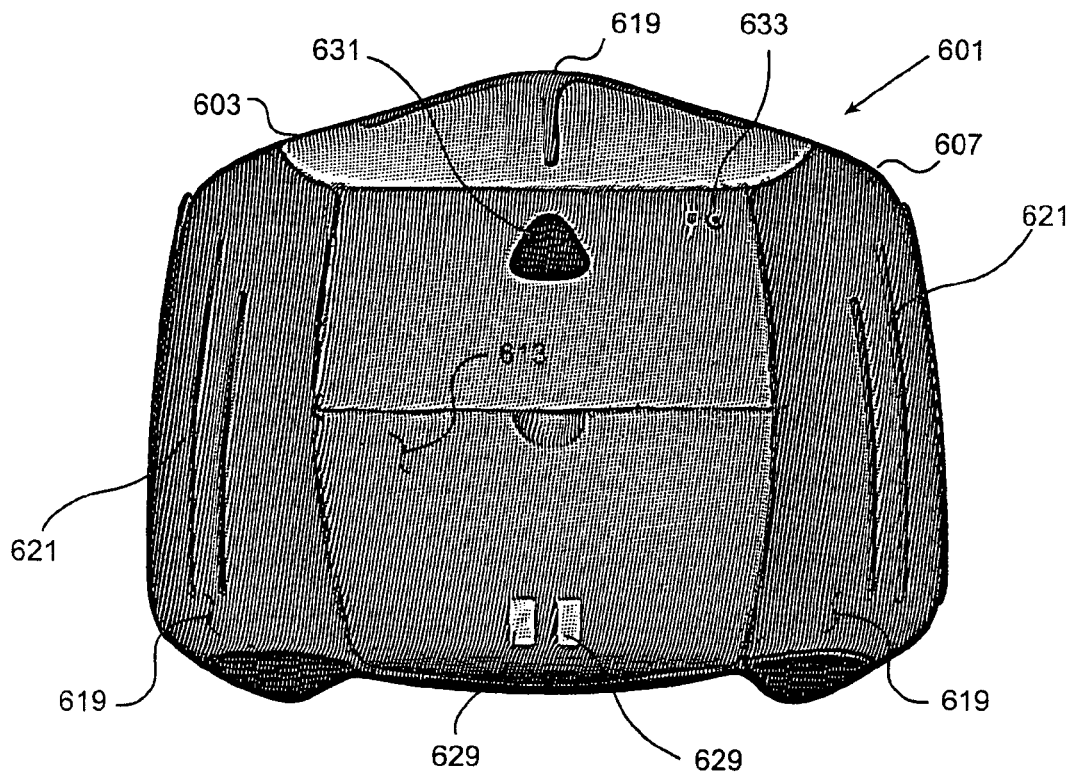
FIG. 4B is a rear view of the device of FIG. 4A.
Figures 4C, 4D:
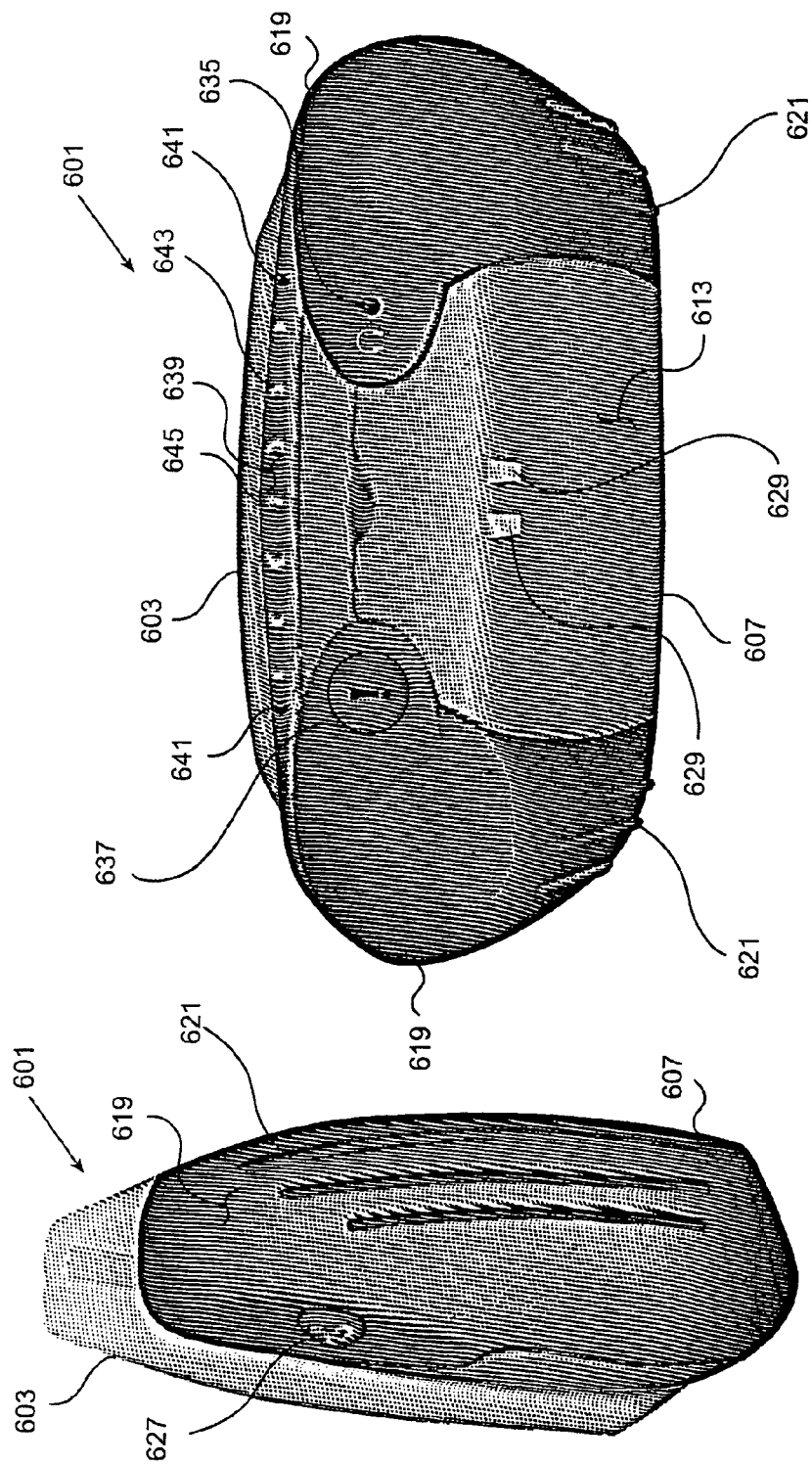
FIG. 4C is a right side view of the device of FIG. 4A.
FIG. 4D is a bottom view of the device of FIG. 4A.
Figure 4E:
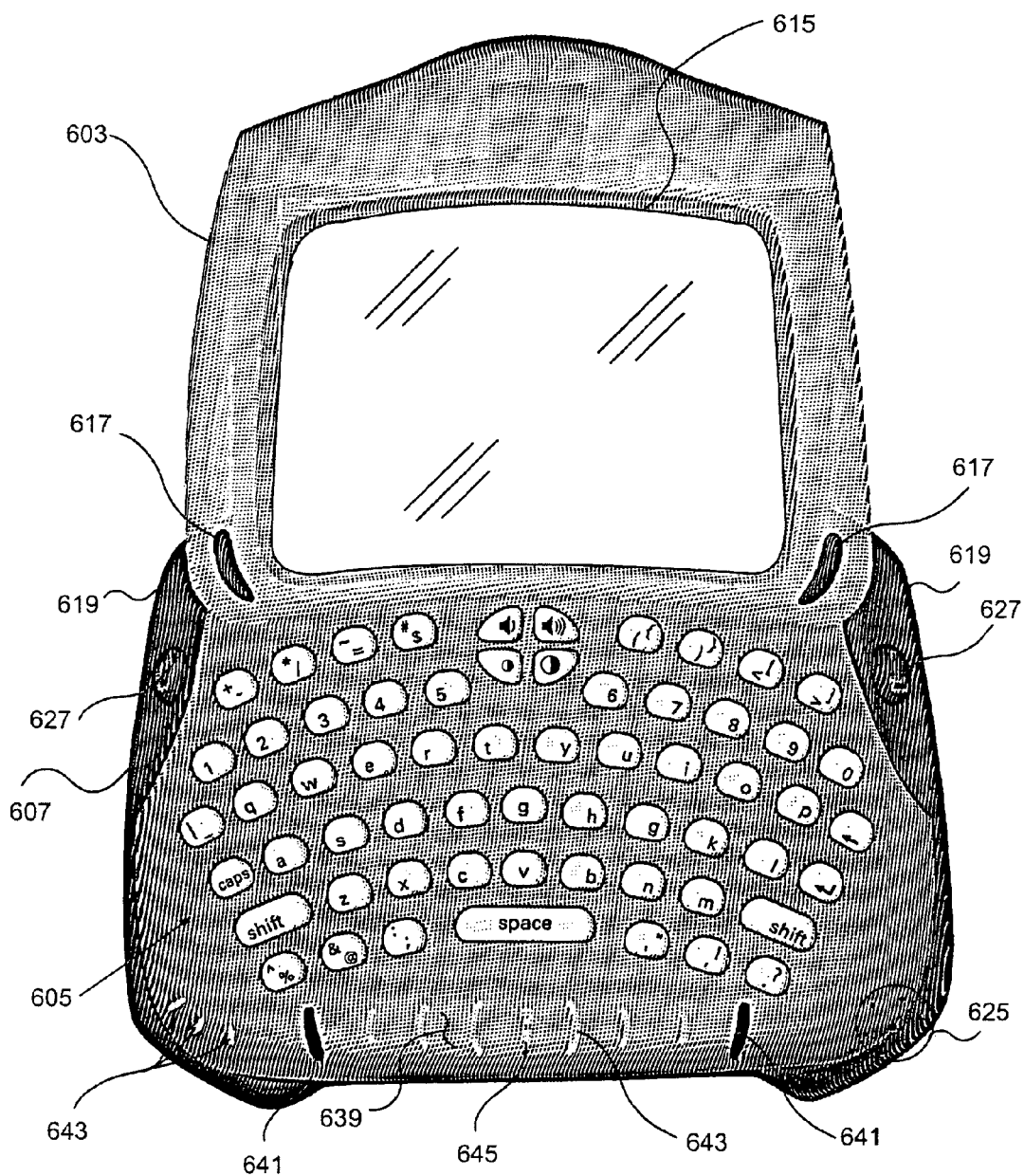
FIG. 4E is a front view of the device of FIG. 4A in an open state in which a constantly visible display is translated relative to a body portion to fully reveal a keyboard or other input device.
Figure 4F:
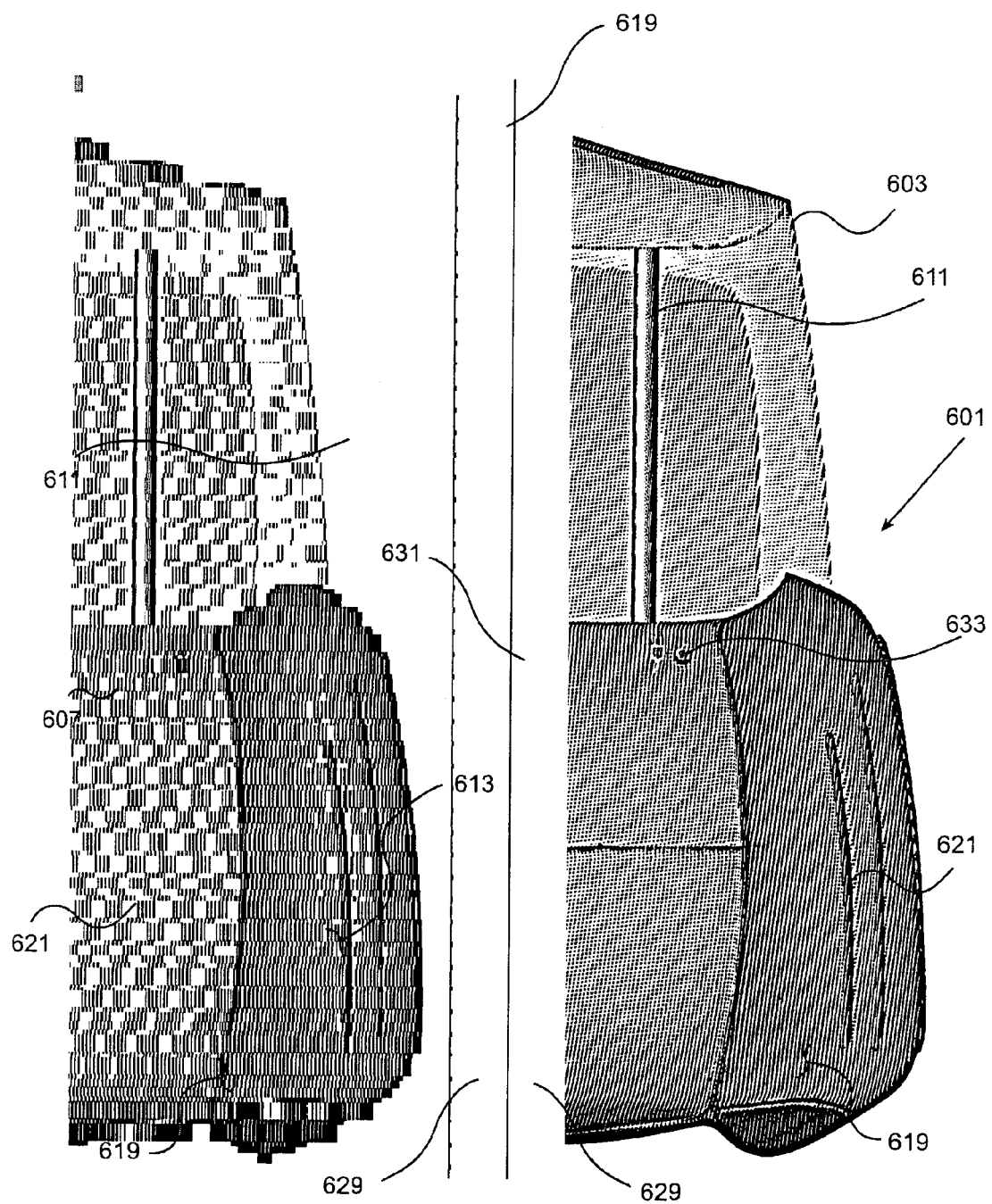
FIG. 4F is a rear view of the device of FIG. 4A while in the open state of FIG. 4E.
Figure 5D:
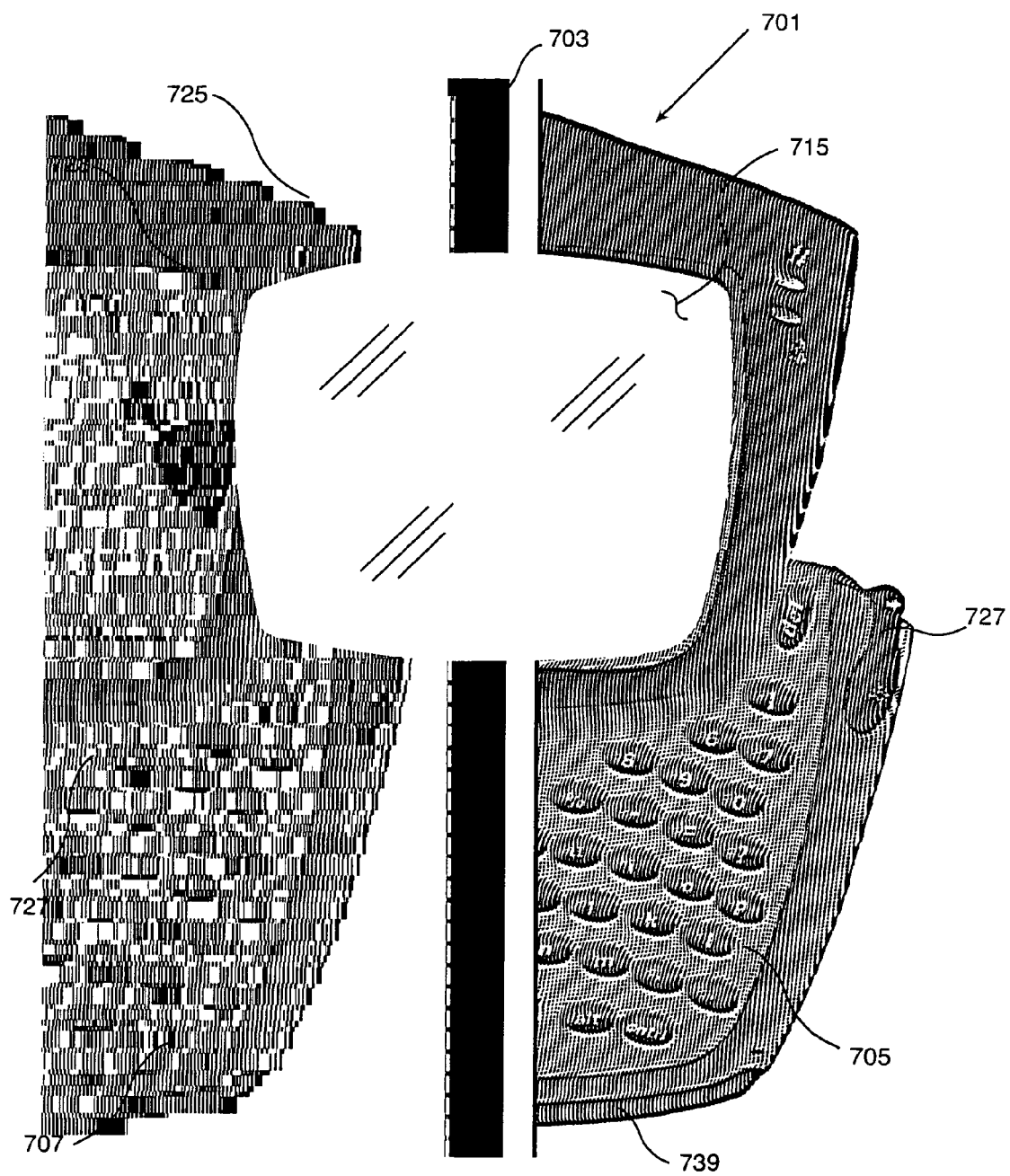
FIG. 5D is a front view of the device of FIG. 5A in an open state in which a constantly visible display is translated relative to a body portion to fully reveal a keyboard or other input device.

The preferred configuration of a device 601 according to the present invention is illustrated in FIGS. 4A-4F. The physical configuration of device 601 corresponds to the configuration illustrated in FIGS. 1A-1C. In FIGS. 4A-4D, device 601 is shown in the closed state in which an always visible display portion 603 conceals a novel QWERTY-type thumbboard 605 that is carried by a body portion 607. In FIGS. 4E and 4F, device 601 is shown in an open state in which display portion 603 has been translated relative to body portion 607 to reveal thumbboard 605. As is best seen in FIG. 4F, display portion 603 may include a plurality of rigid support rails 611 that telescope into body portion 607 to provide additional support of display portion 603 while device 601 is in the open state. It should be understood that other support means, such as interlocking grooves on display portion 603 and body portion 607 may also be used to provide additional support for display portion 603. Display portion 603 is dimensioned to house a plurality of components (not shown). Such components may or may not be directly related to the display of images, such as a GPS antenna and integrated circuit boards. Likewise, body portion 607 is dimensioned to house a plurality of electronic components and systems and necessary integrated circuit boards, such as the microprocessor (not shown) and cache memory (not shown).

Display portion 603 includes a display screen 615. Display screen 615 is preferably a high-resolution, 16-bit color, reflective LCD screen being 320×240 pixels having a diagonal display area of about 3.8 inches. It should be understood that other comparable display screens may be used. Although always visible, display screen 615 will cycle down to a "power save" mode during periods of non-use to conserve power. A cover or shade (not shown) may be utilized to protect display screen 615 from damage, to enhance visibility, to prevent glare, or to alleviate or minimize other common problems associated with such display screens. In the preferred embodiment, display screen 615 is covered by a protective bezel (not shown).

Device 601 is powered by a portable power supply (not shown), such as batteries. In this regard, a power supply cover 613 is provided to cover and protect the portable power supply. In the preferred embodiment, the portable power supply is rechargeable by placing device 601 in a docking station or charging station (not shown). Although device 601 operates on DC current, device 601 may be plugged into and powered by a conventional 110-Volt wall outlet (not shown) with the use of a conventionally functioning AC to DC power transformer (not shown).

A plurality of push pads 617 are located at selected locations on display portion 603. Push pads 617 are preferably located such that the user may translate display portion 603 relative to body portion 607 by pushing on push pads 617 with his thumb or thumbs. In the preferred embodiment, display portion 603 is preferably made of rigid, molded plastic or similar material. Body portion 607 is preferably made of a similar material. As has become popular in recent years, display portion 603 and/or body portion 607 may be partially transparent or translucent, having a colored tint. A plurality of protective bumpers 619, preferably made of rubber or rubberized plastic, are coupled to display portion 603 and body portion 607 at selected locations. A plurality of raised grips 621 may be integrated into protective bumpers 619 to facilitate handling of and interaction with device 601. Device 601 may be of modular construction so that a plurality of the external components may be quickly and easily interchanged. Such interchangeability allows the user to choose from a wide variety of exterior styles and designs, thereby customizing device 601 to the user's particular tastes. In this manner, the appearance of device 601 can be modified to suit the user's ever changing moods and attitudes.

Device 601 includes a plurality of input/output devices, such as LED's 623, at least one speaker 625, a plurality of joysticks 627, conductive power terminals 629 for attachment to the docking station, an infrared (IR) port 631 for the transfer of data, a DC adapter port 633 for attachment of the power transformer, a headphone jack 635 for use with headphone speakers, an on-off switch 637 for toggling device between an "on" state, an "off" state, and/or a "standby" state, as further explained herein, and an analog responder 639. It will be appreciated that LED's 623, joysticks 627, and on-off switch 637 may be multi-functional. For instance, LED's 623 are preferably full-spectrum color LED's that can be selectively programmed by the user to display selected colors at selected intensities and/or selected flash frequencies in response to certain conditions. LED's 623 are particularly useful when display screen 615 has cycled down into the power save mode. This allows the user to interact with device 601 without transitioning device into the open state. By using only LED's 623, speaker 625, joysticks 627, IR port 631, and analog responder 639, a user can perform a considerable amount of input/output without transitioning device 601 into the open state.

Analog responder 639 is a one-dimensional, electronic touch pad disposed within device 601. Analog responder 639 is activated by the user touching selected areas of device 601. Preferably, analog responder 639 is disposed within and centrally located along a lower edge of body portion 607 closest to the user. Such location allows analog responder 639 to be usable when device 601 is either in the closed state or the open state, i.e., when display portion 603 is translated relative to body portion 607. It is preferred that analog responder 639 be adjacent or in close proximity to display screen 615, because analog responder 639 functions primarily to manipulate a cursor or graphical images being displayed on display screen 615. The one-dimensional functional boundaries of analog responder 639 are preferably indicated by raised end ridges 641 or similar visual indicia. For example, one boundary may be indicated by a "−" sign and the opposing end boundary may be indicated by a "+" sign. Such indicia are particularly useful because a primary function of analog responder 639 is to allow the user to selectively input a response to a query from an analog range of possible responses. Using the current example, the end boundary indicated by the "−" might represent a negative response by the user to a query, such as "I do not like pizza;" whereas the end boundary indicated by the "+" might represent a positive response by the user to the same query, such as "I love pizza." In a similar fashion, analog responder 639 is visually segmented, preferably by raised intermediate ridges 643, or similar visual indicia placed incrementally along the length of analog responder 639 between end ridges 641. In the preferred embodiment, intermediate ridges 643 are more pronounced at the center 645 of analog responder 639 and decrease in size or shape, if applicable, toward end ridges 641. This allows the user to quickly determine which portion of analog responder 639 the user is touching, tapping, or depressing.

Referring now to FIGS. 5A-5D in the drawings, an alternate embodiment of the device of the present invention is illustrated. As with device 601, a device 701 has an always visible display portion 703 and a body portion 707. The physical configuration of device 701 corresponds to the configuration illustrated in FIGS. 1A-1C. Display portion 703 carries a display screen 715, similar in form and function to display screen 615. Display portion 703 translates relative to body portion 707 to reveal a QWERTY-type thumbboard 705 which is similar in form and function as thumbboard 605. As is shown, device 701 includes similar input/output ports and devices as device 601, such as LED's 723, at least one speaker 725, a plurality of joysticks 727, and an analog responder 739. In addition, device 701 includes a conventional two-dimensional touch pad 729 on the backside of device 701. Touch pad 729 is located such that it can be utilized by the user while device 701 is in either the closed state or the open state. Touch pad 729 may be programmed to map to display screen 715 in either an absolute mode or a relative mode.

Figure 6C:
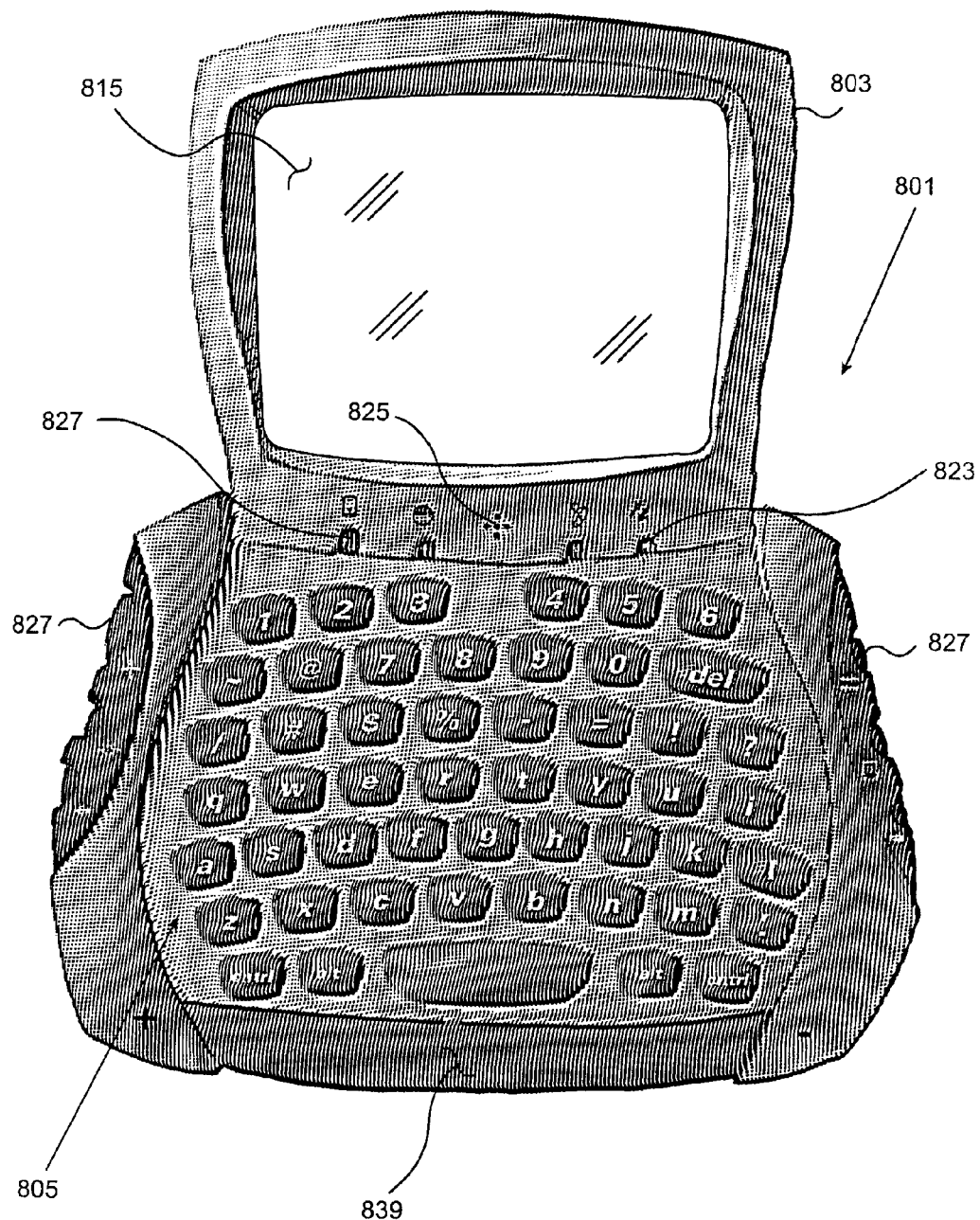
FIG. 6C is a front view of the device of FIG. 6A with the keyboard or other input device fully pivoted relative to the constantly visible display fully reveal the keyboard or other input device.
Figure 7A:
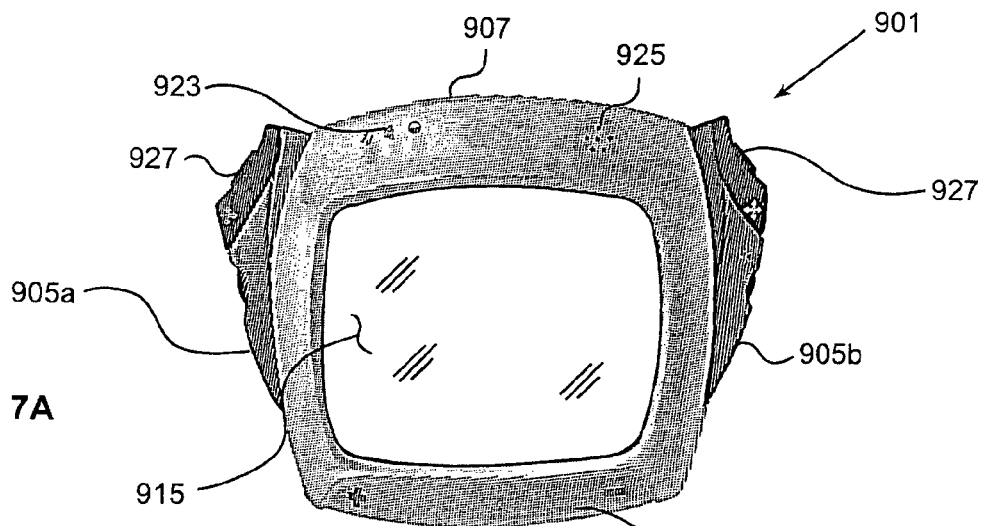
FIG. 7A is a front view of a hand-held, electronic, bi-directional wireless communication device having a physical configuration of the type illustrated in FIGS. 3A-3C.
Figure 7B:
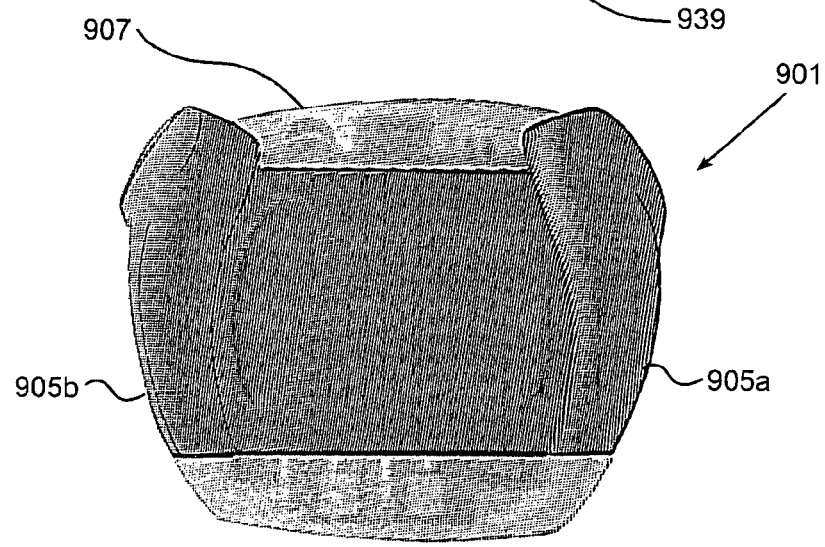
FIG. 7B is a rear view of the device of FIG. 7A.
Figure 7C:
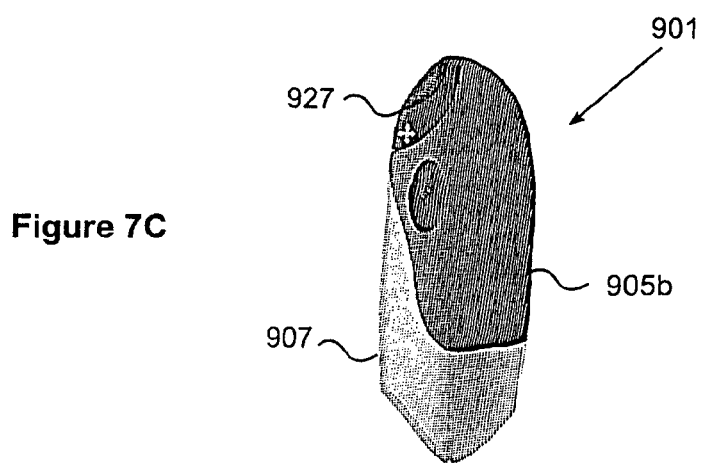
FIG. 7C is a right side view of the device of FIG. 7A.
Figure 7D:
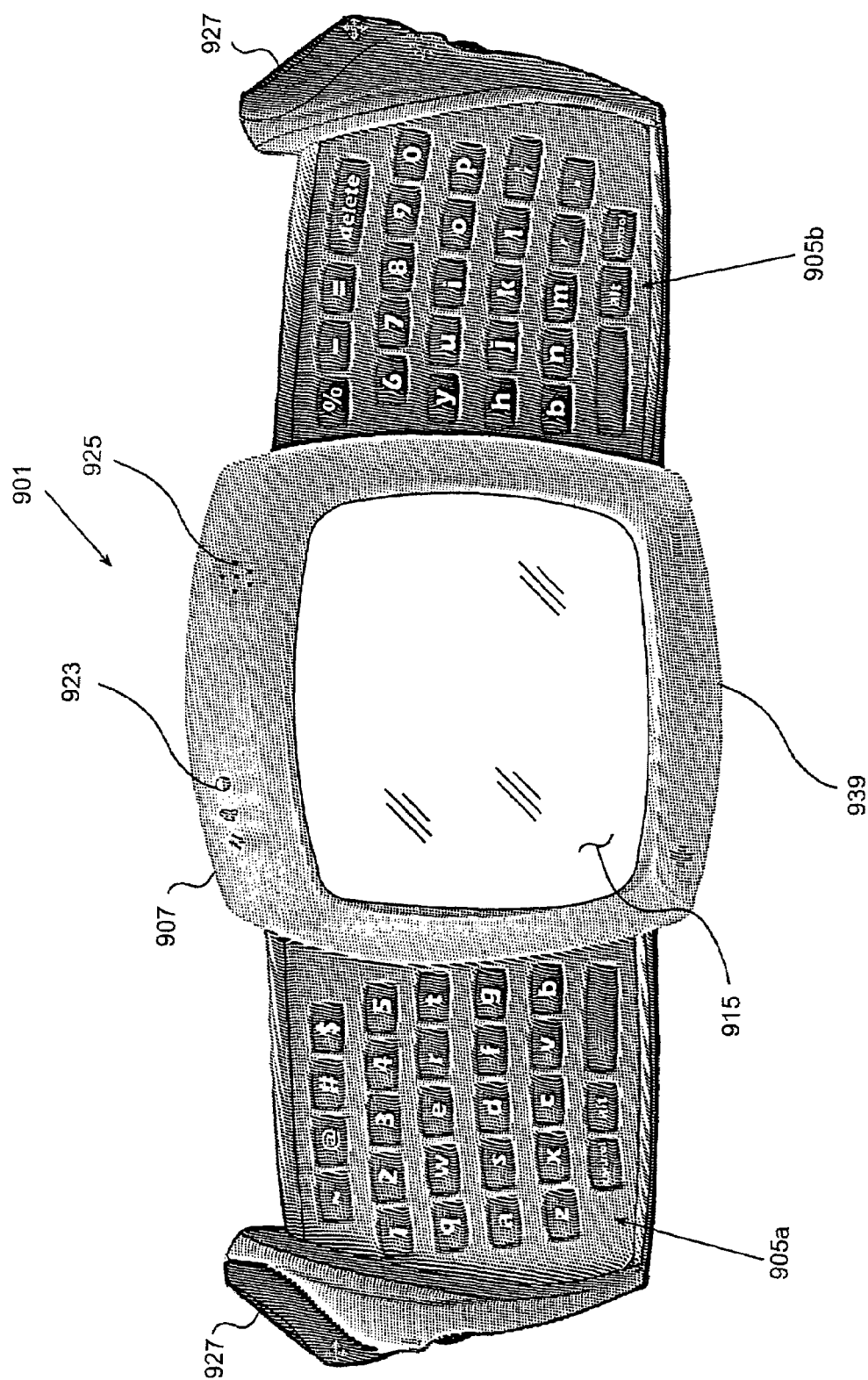
FIG. 7D is a front view of the device of FIG. 7A with a two-piece keyboard fully extended outward from the interior of a body portion.

Referring now to FIGS. 6A-6C in the drawings, another alternate embodiment of the device of the present invention is illustrated. In this embodiment, a device 801 has a clam-shell design. As with previously discussed embodiments, device 801 has an always visible display portion 803 and a body portion 807 which carries a novel QWERTY-type thumbboard 805. In this embodiment, a screen display 815 on display portion 803 and thumbboard 805 on body portion 807 both face outward and are on opposite sides of body portion 807 when device 801 is in the closed state. As device 801 transitions to the open state, display portion 803 hingedly pivots relative to body portion 807 as indicated by arrow 809 in FIG. 6B. In the open state, display screen 815 is adjacent to and visible above thumbboard 805. As is shown, device 801 includes similar input/output ports and devices as device 601, such as LED's 823, at least one speaker 825, a plurality of joysticks 827, and an analog responder 839.

Referring now to FIGS. 7A-7D in the drawings, another alternate embodiment of the device of the present invention is illustrated. In this embodiment, a device 901 has a telescoping design. The physical configuration of device 901 corresponds to the configuration illustrated in FIGS. 3A-3C. As with previously discussed embodiments, device 901 has an always visible display screen 915. Display screen 915 is carried by a body portion 907 into which a novel, two-piece QWERTY-type thumbboard 905a and 905b telescopes into from opposing sides of body portion 907. As is shown, device 901 includes similar input/output ports and devices as device 601, such as LED's 923, at least one speaker 925, a plurality of joysticks 927, and an analog responder 939. Joysticks 923 are carried on each piece of thumbboard 905a and 905b.

The device of the present invention has a configuration that has a relatively small overall size, but is optimized for textual and other non-voice types of communication. With advancements in radio technology, it is possible to include voice communication capability without significantly increasing the overall size of the device. In accordance with the preferred implementation of the present invention, a plurality of alternative communication modes can be supported by the device and the associated wireless network. Some communication modes can be considered to be "cold" forms of communication, while other modes of communication may be considered to be "hot" modes of communication. A cold mode of communication has a high degree of delay or latency associated therewith. Conversely, a hot mode of communication is one which has a low degree of delay or latency associated therewith. Generally, hot modes of communication may be conducted in real time, or instantaneously. Preferably, the alternative communication modes include an e-mail mode, an IM mode, a chat mode, a voice mode, and a video phone mode. The following is a description of the operation of the present invention to enable these various modes of communication as well as the escalation or de-escalation of modes of communication.

The e-mail mode of communication is one in which text messages are keyed in by one user and communicated in a text form over the wireless network to a designated recipient. The e-mail mode of communication on the network utilizes conventional e-mail formats and protocols. E-mail messages may be accumulated and saved in an electronic in-box, whereby the e-mail messages may be read at the leisure and convenience of the recipient.

The instant messaging mode of communication is one in which text messages are keyed in by one user and delivered immediately to the recipient user if the recipient user's device is in an IM receipt mode. IM messages received while in the IM receipt mode subordinate other content on the recipient's device. Thus, IM is considered "hotter" than e-mail. It is desirable that the IM mode of communication on the wireless network utilizes conventional IM formats and protocols.

The chat mode of communication is one in which a plurality of communicants have initiated a chat session in which text, graphical, or voice synthesized messages are exchanged substantially concurrently in a dialog fashion. Because the users in a chat session have affirmatively established a desire to communicate with each other, chat is "hotter" than e-mail and IM. It is desired that the chat mode of communication on the wireless network utilizes conventional chat formats and protocols.

The voice mode of communication is similar to a telephone conversation. The voice mode of communication is possible when a mobile phone is embedded in the device. Because the voice mode of communication is performed concurrently between users in real time, it is "hotter" than e-mail, IM, or chat. It is desired that the voice mode of communication on the wireless network utilizes conventional cellular or digital phone formats and protocols.

The video-voice mode of communication is similar to a video phone conversation. The video-voice mode of communication is possible when a mobile video phone is embedded in the device. Because the video-voice mode of communication is performed concurrently between users in real time, and involves current video, it is "hotter" than e-mail, IM, chat, or voice. It is desired that the video-voice mode of communication on the wireless network utilizes conventional cellular or digital video phone formats and protocols.

In accordance with the preferred embodiment of the present invention, it is possible for communicants to move between modes of communication from a relatively "cold" mode of communication, such as IM, to a relatively "hot" mode of communication, such as a voice. If during an IM session, the communicants decide to "switch up" to the voice communication mode, they can simply input an appropriate command to their respective devices, and the wireless network will establish the voice connection between the users.

Conversely, it is possible for communicants to de-escalate modes of communication from a relatively "hot" to a relatively "cold" mode of communication. This could be done in an effort to reduce airtime or to conserve network energy. For example, if two users are communicating to each other in the voice mode and decide to "switch down" to a chat mode which may burn less network energy, the users simply input an appropriate command to their respective devices, and the wireless network will disconnect the voice connection between the users and establish a chat session between the users.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

We claim:

1. A hand held and operated electronic computing device having a physical configuration comprising:
   a body;
   a display mounted on the body;
   a multi-section keyboard;
   wherein each keyboard section is movably coupled to the body,
   wherein, in a closed state, at least a portion of each keyboard section is concealed,
   at least one data input device located on the body, wherein such at least one data input device can be used to provide input to the electronic computing device when it is in the closed state;
   wherein, in an open state, each keyboard section is substantially visible, and further wherein the at least one data input device located on the body can be used to provide input to the electronic computing device when it is in the open state; and
   wherein the display is visible in the open state and the closed state.

2. The hand held and operated electronic computing device according to claim 1, wherein each keyboard section is completely concealed in the closed state.

3. The hand held and operated electronic computing device according to claim 1, wherein the keyboard is divided into two sections.

4. The hand held and operated electronic computing device according to claim 3, wherein the two keyboard sections are revealed from opposing sides of the display.

5. The hand held and operated electronic computing device according to claim 1, wherein the display is a high-resolution color display.

6. The hand held and operated electronic computing device according to claim 1, further comprising:
   at least one push pad disposed on at least one keyboard section to aid in moving the keyboard section.

7. The hand held and operated electronic computing device according to claim 1, further comprising:
   at least one protective bumper disposed on the body.

8. The hand held and operated electronic computing device according to claim 1, further comprising:
   at least one protective bumper disposed on at least one keyboard section.

9. The hand held and operated electronic computing device according to claim 1, further comprising:
   at least one input/output component from the following group:
   a. a light;
   b. an LED;
   c. a button;
   d. a joystick;
   e. a touch pad;
   f. a directional or "D" pad;
   g. a jog wheel;
   h. a scroll wheel;
   i. a speaker;
   j. a headphone jack;
   k. a microphone;
   l. an infrared port;
   m. a DC adaptor port;
   n. an antenna;
   o. an on/off switch;
   p. an analog responder; and
   q. a conductive power terminal.

10. The hand held and operated electronic computing device according to claim 9 wherein the input/output components are carried by at least one keyboard section.

11. The hand held and operated electronic computing device according to claim 9 wherein the input/output components are carried by the body.

12. The hand held and operated electronic computing device according to claim 9 wherein the input/output components are carried by both the body and at least one keyboard section.

13. The hand held and operated electronic computing device according to claim 9 wherein the input/output components are located to facilitate interaction with the device while in the closed state.

14. The hand held and operated electronic computing device according to claim 9 wherein the LED is a full-spectrum LED.

15. The hand held and operated electronic computing device according to claim 1, wherein each keyboard section telescopes into the body.

16. The hand held and operated electronic computing device according to claim 1, wherein each keyboard section moves in a plane that is generally parallel to the display.

17. A hand held and operated electronic computing device having a physical configuration comprising:
   a display portion;
   at least two input-device portions;
   at least one input-device carried by each input-device portion;
   wherein each input-device portion is movably coupled to the display portion,
   wherein, in a closed state, each input-device portion is at least partially concealed,
   at least one data input device located on the display portion, wherein such at least one data input device can be used to provide input to the electronic computing device when it is in the closed state;
   wherein, in an open state, each input device is substantially visible, and further wherein the at least one data input device located on the display portion can be used to provide input to the electronic computing device when it is in the open state; and
   wherein the display is visible in the open state and the closed state.

18. The hand held and operated electronic computing device according to claim 17, wherein each input-device portion is completely concealed in the closed state.

19. The hand held and operated electronic computing device according to claim 17, wherein there are two input-device portions.

20. The hand held and operated electronic computing device according to claim 19, wherein the two input-device portions are revealed from opposing sides of the display portion.

21. The hand held and operated electronic computing device according to claim 17, wherein the display is a high-resolution color display.

22. The hand held and operated electronic computing device according to claim 17, further comprising:
   at least one push pad disposed on at least one input-device portion to aid in moving the input-device portion.

23. The hand held and operated electronic computing device according to claim 17, further comprising:
   at least one protective bumper disposed on the display portion.

24. The hand held and operated electronic computing device according to claim 17, further comprising:
   at least one protective bumper disposed on at least one input-device portion.

25. The hand held and operated electronic computing device according to claim 17, further comprising:
   at least one input/output component from the following group:
   a. a light;
   b. an LED;
   c. a button;
   d. a joystick;
   e. a touch pad;
   f. a directional or "D" pad;
   g. a jog wheel;
   h. a scroll wheel;
   i. a speaker;
   j. a headphone jack;
   k. a microphone;
   l. an infrared port;
   m. a DC adaptor port;
   n. an antenna;
   o. an on/off switch;
   p. an analog responder; and
   q. a conductive power terminal.

26. The hand held and operated electronic computing device according to claim 25 wherein the input/output components are carried by at least one input-device portion.

27. The hand held and operated electronic computing device according to claim 25 wherein the input/output components are carried by the display portion.

28. The hand held and operated electronic computing device according to claim 25 wherein the LED is a full-spectrum LED.

29. The hand held and operated electronic computing device according to claim 17 wherein the input/output components are carried by both the display portion and at least one input-device portion.

30. The hand held and operated electronic computing device according to claim 25 wherein the input/output components are located to facilitate interaction with the device while in the closed state.

31. The hand held and operated electronic computing device according to claim 17, wherein each input-device portion moves in a plane that is generally parallel to the display.

32. The hand held and operated electronic computing device according to claim 17, wherein a keyboard is carried by at least one input-device portion.

33. The hand held and operated electronic computing device according to claim 17, wherein a twelve key keyboard is carried by at least one input-device portion.

* * * * *